United States Patent [19]

Kimura

[11] Patent Number: 4,542,415

[45] Date of Patent: Sep. 17, 1985

[54] TRACKING ERROR DETECTING DEVICE FOR DISC-TYPE VIDEO SIGNAL RECORDER/REPRODUCER

[75] Inventor: Kenji Kimura, Tachikawa, Japan

[73] Assignee: Olympus Optical Co., Ltd., Tokyo, Japan

[21] Appl. No.: 466,831

[22] Filed: Feb. 16, 1983

[30] Foreign Application Priority Data

Feb. 26, 1982 [JP] Japan ................... 57-29856

[51] Int. Cl.[4] ................... G11B 21/10; H04N 5/78
[52] U.S. Cl. ................... 358/342; 369/43; 360/77
[58] Field of Search ................... 358/342, 327; 360/77, 360/33.1, DIG. 1; 369/44, 45, 46, 47, 50, 43

[56] References Cited

U.S. PATENT DOCUMENTS

| | | | |
|---|---|---|---|
| 3,829,892 | 8/1974 | Nagahiro et al. | 360/27 |
| 4,056,832 | 11/1977 | de Boer et al. | 360/77 |
| 4,079,412 | 3/1978 | Kosaka | 358/328 |
| 4,123,788 | 10/1978 | Kruger | 360/77 |
| 4,213,148 | 7/1980 | Clemens | 360/77 X |
| 4,416,002 | 11/1983 | Oguino et al. | 360/77 X |

*Primary Examiner*—Raymond F. Cardillo, Jr.
*Assistant Examiner*—Alan K. Aldous
*Attorney, Agent, or Firm*—Frishauf, Holtz, Goodman & Woodward

[57] ABSTRACT

A tracking information detecting device for recording a video signal together with a pilot signal on one track of a magnetic disc and detecting tracking information at the time of reproduction. In this device, the pilot signal has a predetermined frequency at least ten times that of the horizontal synchronizing signal. The pilot signal is recorded in such a manner that its phase is displaced with respect to the horizontal synchronizing signal at every track. The horizontal synchronizing signal is displaced at every track at the time of reproduction of the recorded video signal, and the phase difference between the horizontal synchronizing signal and the pilot signal is detected as the tracking information.

16 Claims, 22 Drawing Figures

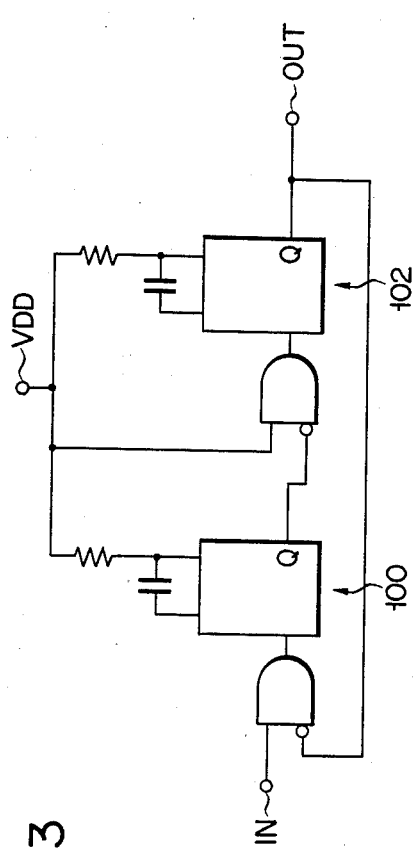
F I G. 3
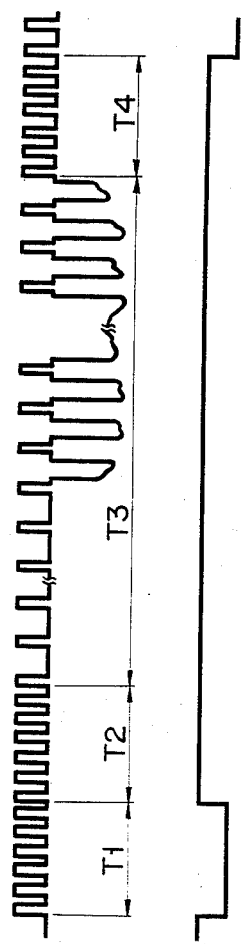
F I G. 4A
F I G. 4B

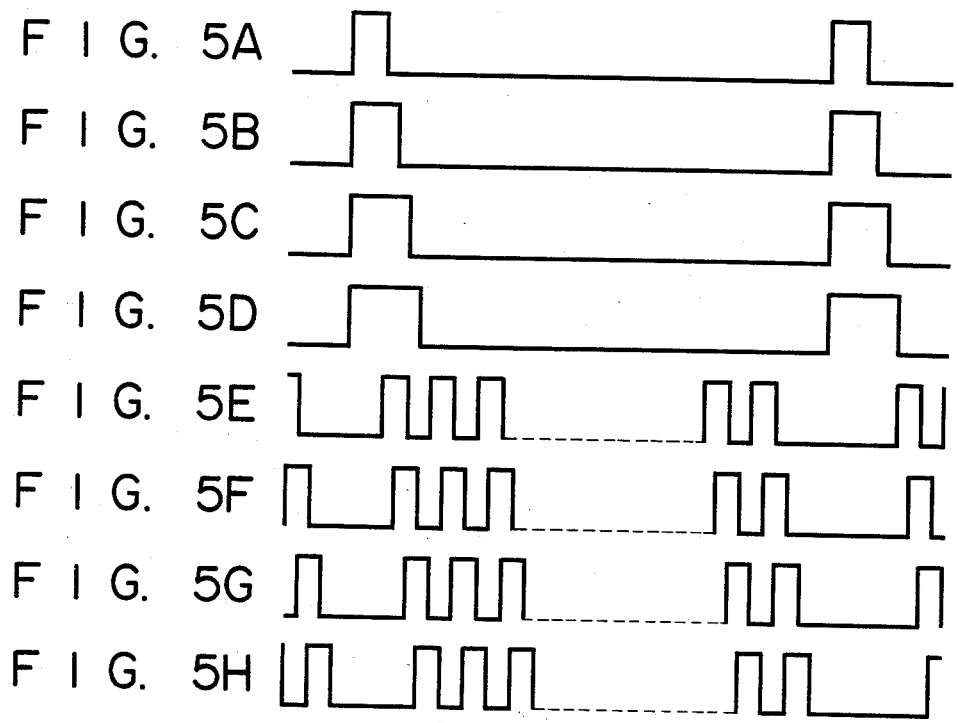
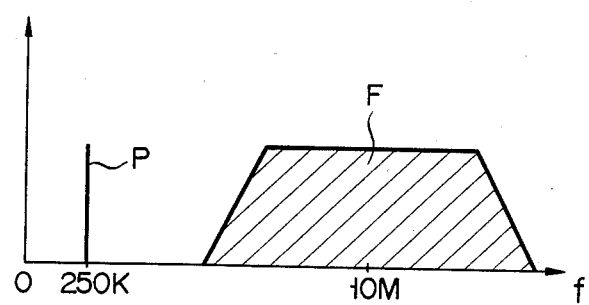

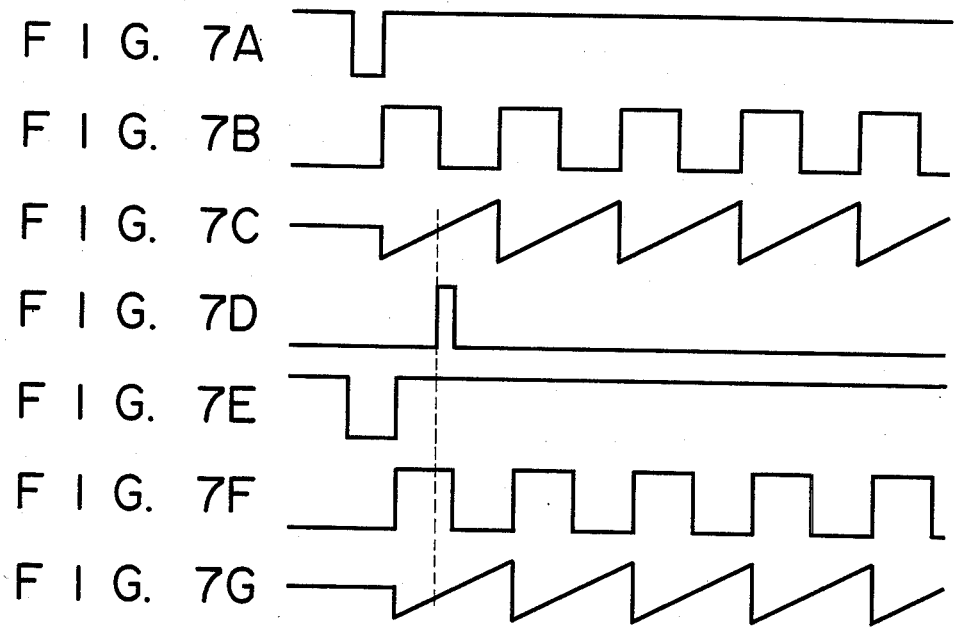
FIG. 7A
FIG. 7B
FIG. 7C
FIG. 7D
FIG. 7E
FIG. 7F
FIG. 7G
FIG. 8
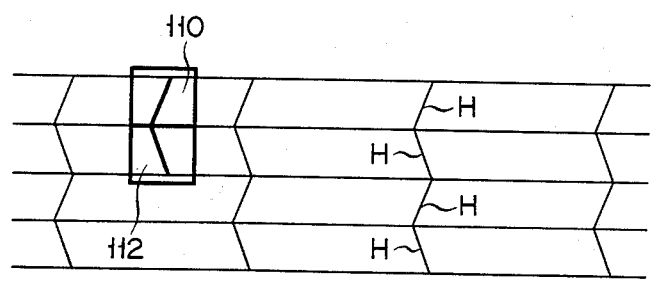

TRACKING ERROR DETECTING DEVICE FOR DISC-TYPE VIDEO SIGNAL RECORDER/REPRODUCER

BACKGROUND OF THE INVENTION

The present invention relates to a tracking information detecting device used for a video signal recorder/reproducer.

A video signal recorder/reproducer such as a video tape recorder or a video disc apparatus has recently been widely used. One of the factors for determining the quality of a picture in the recorder/reproducer of this type is the tracking accuracy of its reproducing head. Heretofore, a variety of devices have been proposed to detect the tracking error of a reproducing head. In one of the detecting devices, one or two detecting heads are provided adjacent to a reproducing head so as to check the track on one side or the tracks on both sides adjacent to the track which is being reproduced. The output of the detecting head or heads will vary in response to the displacement of the tracking. Since the detecting heads are so provided in detecting devices of this type, the mechanical structure of such a detecting device becomes complicated and the device becomes expensive. This device has another disadvantage in that it is difficult to apply to an azimuth recording type recorder/reproducer. In another of the detecting devices, pilot signals of different frequencies are superposed on each track of a video signal in the recorder. In this device, the frequency of the pilot signal is detected at the time of reproducing the track to obtain tracking error information. According to this device, it is not necessary to provide a detecting head, but it is possible that a certain frequency of the pilot signal might interfere with the video signal. As a result, a beat will be produced by the pilot signal, and thus, accurate tracking information cannot be obtained.

SUMMARY OF THE INVENTION

It is an object of the present invention to provide a tracking information detecting device for a video signal recorder/reproducer which is capable of accurately obtaining tracking information using a simple structure without providing a detecting head.

In order to achieve the above object, there is provided, according to the present invention, a tracking information detecting device for a video signal recorder/reproducer for recording and reproducing a video signal via a plurality of tracks regularly provided on a recording medium to bring the recording positions of a horizonal synchronizing signal into the same position, comprising a recorder for recording a pilot signal having a frequency higher by at least ten times that of a horizontal synchronizing signal together with a video signal by displacing the phase of the pilot signal at a predetermined angle with respect to the horizontal synchronizing signal at every one track on a recording medium, a circuit for detecting the horizontal signal and the pilot signal from a reproduced video signal, and a comparator for producing tracking information in accordance with the phase difference between the horizontal synchronizing signal and the pilot signal.

BRIEF DESCRIPTION OF THE DRAWINGS

FIG. 3 is a circuit diagram of an oscillator in the recording system;

FIGS. 4A and 4B are waveform diagrams showing an NTSC television signal and a vertical synchronizing signal to be supplied to the recording system;

FIGS. 5A to 5H are timing charts of the recording system showing the principle of this embodiment;

FIG. 6 is a graph showing the frequency spectrum of a signal to be recorded on a disc in this embodiment;

FIGS. 7A to 7G are timing charts of the reproducing system showing the principle of the embodiment; and FIG. 8 is a view showing another embodiment of the present invention.

DETAILED DESCRIPTION OF THE PREFERRED EMBODIMENTS

Figure 1:
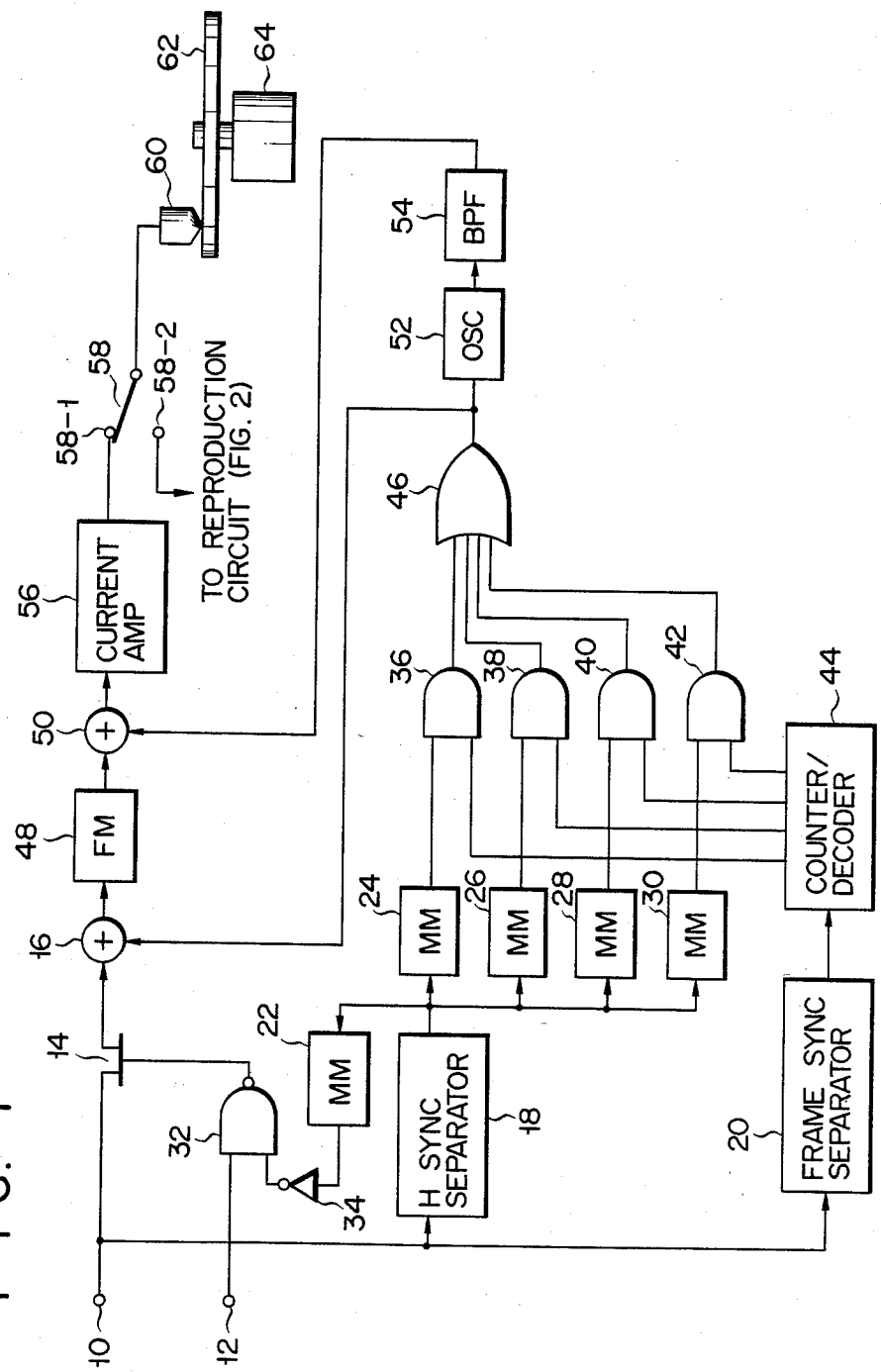
FIG. 1 is a block diagram of a recording system of an embodiment of a tracking information detecting device according to the present invention.
Figure 2:
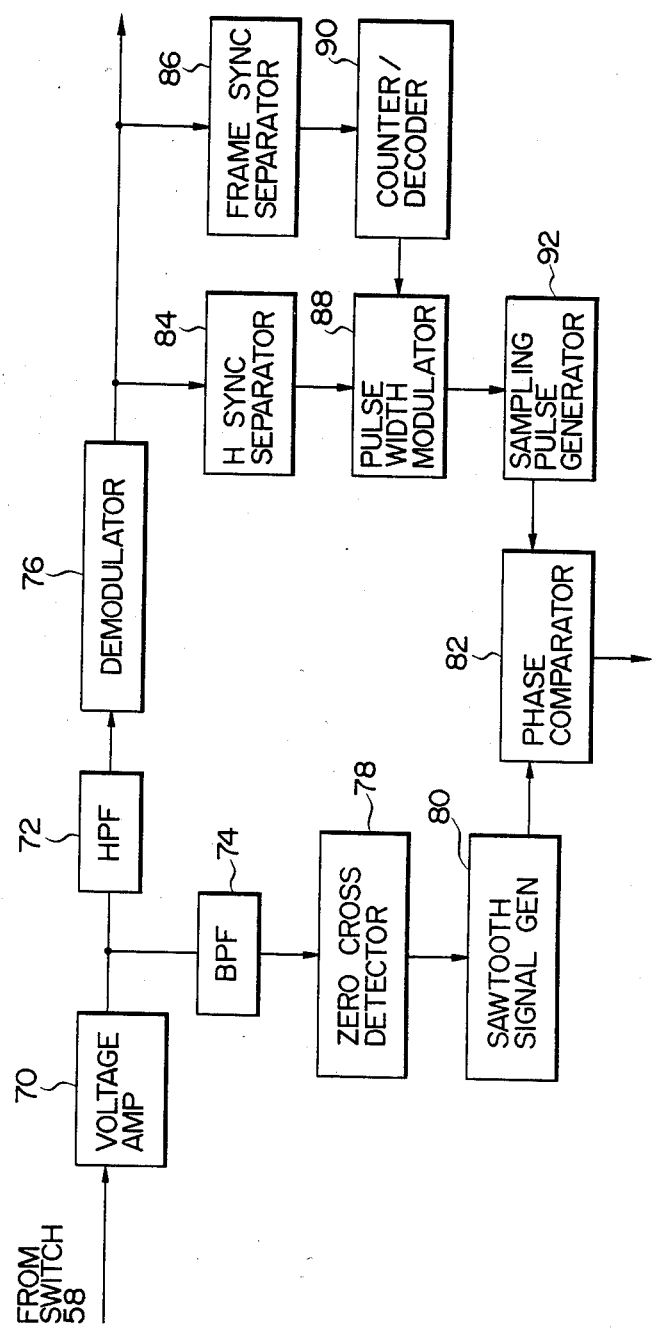
FIG. 2 is a block diagram of a reproducing system.

An embodiment of a tracking information detecting device according to the present invention will now be described in more detail with reference to the accompanying drawings. This embodiment employs a system for recording a video signal together with a pilot signal of a predetermined frequency which is low enough so as not to interfere with the video signal in order to detect tracking information. FIG. 1 is a circuit diagram showing the recording system of the pilot signal, and FIG. 2 is a circuit diagram showing the reproducing system of the pilot signal. This embodiment will be described with respect to its application to a video disc apparatus. In FIG. 1, an NTSC television signal is supplied to a video signal input terminal 10, and a V DRIVE signal (a vertical synchronizing signal, negative pulse) as one of the synchronizing signals is supplied to a synchronizing signal input terminal 12. The NTSC television signal is supplied through an analog gate 14 (Nch MOSFET) to the first input terminal of a mixer 16. The analog gate 14 inhibits the passage of a horizontal synchronizing signal during other than the time period in which the vertical synchronizing signal of the NTSC television signal (to be described later) is supplied. The television signal is also supplied to a horizontal synchronizing signal separator 18 and to a frame synchronizing signal separator 20. The frequency of a vertical synchronizing signal is divided by two to form a frame synchronizing signal. The output of the separator 18 is supplied to monostable multivibrators 22, 24, 26, 28 and 30. The time constants of the multivibrators 22, 24, 26, 28 and 30 are respectively 6, 3, 4, 5 and 6 μsec. When these multivibrators are triggered, the multivibrators respectively produce negative pulses of these pulse widths. The output signal of the multivibrator 22 is supplied through an inverter 34 to the first input terminal of a NAND gate 32, and the V DRIVE signal is supplied to the second input terminal of the NAND gate 32. The output signal of the NAND gate 32 is supplied to the gate of the analog gate 14. Since the pulse width of the horizontal synchronizing signal is 5 μsec., the horizontal synchronizing pulse is sufficiently inhibited by the output signal of the multivibrator 22 having a 6 μsec. time constant to pass through the gate. The output signals of the multivibrators 24, 26, 28 and 30 are respectively supplied to the first input terminals of AND gates 36, 38, 40 and 42. The output signal of the separator 20 is supplied to the clock terminal of a counter/decoder 44. The counter/decoder 44 has a 2-bit ring counter and a decoder for decoding the output of the counter. The four output terminals of the counter/decoder 44 are respectively connected to the second input terminals of the AND gates 36, 38, 40 and 42. That is, a signal of logic level "1" is supplied to one of the four AND gates 36, 38, 40 and 42 for every one frame. The output signals of the AND gates 36, 38, 40 and 42 are supplied to the second input terminal of the mixer 16 through an OR gate 46. In other words, a negative horizontal synchronizing signal which varies in its pulse width is inserted into the television signal at every one frame instead of the horizontal synchronizing signal extracted via the analog gate 14. The output signal of the mixer 16 is applied through a frequency modulator 48 to the first input terminal of a mixer 50. On the other hand, the output signal of the OR gate 46 is applied to an oscillator 52. The oscillator 52 is triggered at the trailing edge of the output pulse of the OR gate 46, and oscillates at 250 kHz. The details of the oscillator 52 are shown in FIG. 3. The oscillator 52 has two monostable multivibrators 100 and 102. The multivibrators 100 and 102 may be SN 74123 manufactured by Texas Instruments, Inc. The output pulse of the OR gate 46 becomes a trigger input of one multivibrator. As a result, when the output signal of the OR gate 46 changes from logic level "0" to logic level "1", the oscillator 52 will start oscillating. The output signal of the oscillator 52 is supplied through a band pass filter 54 to the second input terminal of the mixer 50. The pilot signal of 250 kHz is supplied to the television signal in synchronization with the trailing edge of the horizontal synchronizing pulse via the mixer 50. As described above, since the trailing edge of the horizontal synchronizing signal is phase-modulated at every track, the record-starting phase of the pilot signal is modulated in accordance with the track. The output signal of the mixer 50 is applied through a current amplifier 56 and the first movable contact 58-1 of a switch 58 to a magnetic head 60. The head 60 contacts a magnetic disc 62. When the disc 62 is rotated by a motor 64, annular recording tracks are formed on the disc 62. The head 60 is moved inward by one track in the radial direction of the disc 62 for every one revolution of the disc 62, whereby concentrically annular recording tracks are formed on the disc 62.

The second stationary contact 58-2 of the switch 58 is connected to a reproduction circuit shown in FIG. 2. In FIG. 2, the signal from the head 60 is supplied through the switch 58 to a voltage amplifier 70. The output signal of the amplifier 70 is supplied to a high pass filter 72 and a band pass filter 74. The filters 72 and 74 are respectively constructed to extract the FM-modulated television signal and the pilot signal. The output signal of the filter 72 is returned to the original television signal through a demodulator 76, and is supplied to a monitoring device such as a CRT (not shown). The output signal of the filter 74 is supplied to a zero cross detector 78. The output of the detector 78 triggers a sawtooth signal generator 80. The output terminal of the generator 80 is connected to the first input terminal of a phase comparator 82. On the other hand, the output of the demodulator 76 is supplied to a horizontal synchronizing signal separator 84 and a frame synchronizing signal separator 86. The horizontal synchronizing signal is supplied to a pulse width modulator 88. The modulator 88 corresponds to the section of the multivibrators 24, 26, 28 and 30 and the AND gates 36, 38, 40 and 42 in the recording circuit. The frame synchronizing signal is input to the clock terminal of a counter/decoder 90. The counter/decoder 90 corresponds to the counter/decoder 44 in the recording circuit. The output signal of the modulator 88 is supplied to a sampling pulse generator 92, and the output of the generator 92 is supplied to the second input terminal of the comparator 82. The output of the comparator 82 is output as tracking information.

The operation of this embodiment will now be described. It is assumed that the motor 64 is rotated at a constant angular velocity (30 r.p.s.) and a television signal of one frame is recorded on a track. The record starting positions of the respective horizontal synchronizing signals are brought to a linear line which extends in the radiation direction. The NTSC television signal, whose inverted signal is shown in FIG. 4A, is supplied to the input terminal 10. FIG. 4A shows the signal of one field. The one field period of the signal has a vertical synchronizing signal duration T1, an equalizing pulse duration T2, a video signal duration T3 and an equalizing pulse duration T4. The V DRIVE signal of the negative pulse signal synchronized with the vertical synchronizing signal duration, as shown in FIG. 4B, is supplied to the input terminal 12. Since the V DRIVE signal is supplied to one terminal of the NAND gate 32, the NAND gate 32 is logic level "1" at the output terminal during the duration T1 of the vertical synchronizing signal. Since the analog gate 14 is conductive when the gate is logic level "1" and is nonconductive when the gate is logic level "0", the television signal passes through the analog switch 14 during the period T1 of the vertical synchronizing signal. The NAND gate 32 outputs a signal of logic level "0" due to the output of the multivibrator 22 except during the period T1 of the vertical synchronizing signal, thereby interrupting the analog switch 14. The multivibrator 22 is triggered by the leading edge of the horizontal synchronizing pulse, produces a negative pulse having a 6 $\mu$sec. pulse width, and sets the output of the NAND gate 32 to logic level "0". As a result, the analog switch 14 inhibits the horizontal synchronizing pulse except for the period T1 of the vertical synchronizing signal. On the other hand, since the leading edge of the horizontal synchronizing signal triggers the multivibrators 24, 26, 28 and 30, the multivibrators 24, 26, 28 and 30 respectively produce negative pulses having pulse widths of 3, 4, 5 and 6 $\mu$sec. synchronized with the leading edge of the horizontal synchronizing pulse. Since the disc 62 records the signal of one frame on one track and the counter/decoder 44 counts the frame synchronizing signals, the decoded output (logic level "1") varies for every one revolution of the disc 62. As a result, the OR gate 46 produces a negative pulse which varies from a pulse width of 3 through 4, 5, 6, 3, 4, . . . $\mu$sec. in synchronization with the leading edge of the horizontal synchronizing pulse for every one revolution of the disc 62. The output signal of the OR gate 46 is mixed by the mixer 16 with the signal, from which the horizontal synchronizing pulses are extracted, supplied through the analog switch 14. The horizontal synchronizing pulse in the output of the mixer 16 is phase-modulated at the trailing edge of the pulse from 3, through 4, 5, 6, 3, 4, . . . $\mu$sec. In other words, the horizontal synchronizing pulse is pulse-width-modulated at every track, and the phase of the trailing edge of the horizontal synchronizing pulse in the adjacent track is always displaced. The horizontal synchronizing pulses of the first to fourth tracks are respectively shown in FIGS. 5A to 5D. The phases of the leading edges of the horizontal synchronizing pulses are brought into coincidence in all the tracks.

On the other hand, since the trailing edge of the output pulse of the OR gate 46 triggers the oscillator 52, the oscillator 52 produces pilot signals which are delayed by 1 μsec., as shown in FIGS. 5E to 5H, in the first to fourth tracks. The noise components except 250 kHz of the pilot signals are removed by the filter 54, and the pilot signals are supplied to the mixer 50. As a consequence, the pilot signal of 250 kHz is superposed on the FM-modulated television signal. In other words, the phase of the pilot signal is shifted at each track. The shifting amount of the phase is 90° at every track since the pilot signal is 250 kHz (a period of 4 μsec.), and the pilot signal becomes in phase at every five tracks. The central frequency of the FM modulator 48 is set at 10 MHz. FIG. 6 shows a graph showing the frequency spectrum of the output signal of the mixer 50. In FIG. 6, reference character P designates a pilot signal, and F the FM signal of the television signal. In order to prevent the interference between the pilot signal and the FM signal it is necessary to set the frequency of the pilot signal to be apart from that of the central frequency of the FM modulator 48. In this manner, the pilot signals of different phases are recorded on the disc 62 via the head 60 at the adjacent tracks.

The reproduction operation of the disc 62, on which such pilot signals are recorded, will now be described. The FM components of the television signal are extracted via the filter 72 from the reproduction signal from the head 60, and the pilot signals are extracted via the filter 74. The FM components are returned to the original television signal via the demodulator 76, and supplied to the monitoring device. The horizontal synchronizing pulses are separated from the television signal. The horizontal synchronizing pulse output from the separator 84 is shown in FIG. 7A. On the other hand, the pilot signal is input to the detector 78, and the output of the detector 78 becomes as shown in FIG. 7B. In other words, the detector 78 starts outputting the pulse signal from the trailing edge of the horizontal synchronizing pulse. The generator 80 applies a sawtooth signal as shown in FIG. 7C in synchronization with the zero cross output to one input terminal of the comparator 82.

On the other hand, the frame synchronizing signal is separated from the television signal, and is input to the counter/decoder 90. In other words, the modulation factor of the modulator 88 is varied for every one frame, i.e., for every one track of the disc 62. The modulator 88 modulates the pulse width of the horizontal synchronizing pulse at every one track from 5, through 6, 7, 8, 5, 6, ... μsec. This pulse width is the sum of the time constant of the multivibrator 24, 26, 28 or 30 and 2 μsec. This 2 μsec. represents the half period of the pilot signal (250 kHz). The generator 92 outputs the sampling pulse as shown in FIG. 7D in accordance with the trailing edge of the pulse-width-modulated horizontal synchronizing pulse. Therefore, when the tracking is accurate, the timing of the sampling pulse corresponds to that of the half period of the sawtooth signal. The sawtooth signal is adjusted so that the output of the comparator 82 becomes zero volts at this time. When the tracking is displaced to the next track side, the phase of the pilot signal is slightly delayed. The pilot signal reproduced in this case becomes the sum of the vectors of the signals of this track and the next track, the phase of the pilot signal is slightly delayed according to the tracking error. Since the leading edges of the horizontal synchronizing signals are brought to coincide with each other at the respective tracks, the sampling pulse thus delayed at a predetermined period from the leading edge of the horizontal synchronizing signal can be output at a predetermined time even if the tracking is displaced. When the tracking is displaced, the phases of the output signals of the detector 78 and generator 80 are respectively delayed as shown in FIGS. 7F and 7G. As a result, the output signal of the comparator 82 becomes tracking information having a polarity and an absolute value respectively corresponding to the direction and the degree of the displacement of the tracking.

In the embodiment described above, a video signal of one frame is recorded on one track of the disc so that the leading edges of the respective horizontal synchronizing pulses are made to radially coincide with each other. Since the horizontal synchronizing pulses are pulse-width modulated at every track in this case, the trailing edges of the respective horizontal synchronizing pulses are not made to coincide with each other. Since the pilot signals are respectively recorded from the trailing edges of the horizontal synchronizing pulses, the phases of the pilot signals are different at every track. Therefore, the tracking information can be obtained by detecting the displacement of the phase of the pilot signal as the reference of the leading edge of the horizontal synchronizing pulses at the time of reproduction. The pilot signal does not interfere with the video signal in this case.

In the embodiment described above, the recording medium employed is a magnetic disc. However, the present invention is not limited to a device using such a disc. For example, a tape may be employed when the recording positions of the horizontal synchronizing signals are made to coincide with each other at the respective tracks, and the recording system may also employ an optical type. This invention can also be applied to an azimuth recording system. The relationship between the magnetic head and the track in this case is shown in FIG. 8. As shown in FIG. 8, a pair of heads 110 and 112 which are complementary to each other in an azimuth angle integrally perform tracking on two tracks. In this case, the heads are moved by a distance corresponding to the width of two tracks at every two revolutions of the disc. The disc is recorded by the head 110 at the initial revolution of the disc and by the head 112 at the next revolution of the disc. The head 110 corresponds to (n+1)th and (n+3)th tracks, and the head 112 corresponds to (n+2)th and (n+4)th tracks. In this case, the timings of the horizontal synchronizing pulses are made to coincide with each other as shown by H in FIG. 8. In this manner, in the embodiment described above, azimuth recording can be performed. In the above embodiment, the displacements of the pilot signal have been set to four types. The displacements of the pilot signal may be more than three types. It is not always necessary to modulate the pulse width of the horizontal synchronizing signal.

What is claimed is:

1. A tracking information detecting system for a video signal recorder/reproducer for recording/reproducing a video signal by tracing along tracks annularly formed on a disc-shaped recording medium rotated by a motor at a predetermined angular velocity, said video signal including a horizontal synchronizing signal, said detecting system comprising:

first means for recording on said recording medium a pilot signal having a frequency at least ten times higher than that of the horizontal synchronizing signal together with a video signal by shifting the phase of the pilot signal a predetermined amount for every track; and second means for reproducing the video signal and the pilot signal previously recorded on said recording medium and for detecting the phase difference between the horizontal synchronizing signal and the pilot signal at every track so as to obtain a tracking information corresponding to said phase difference;

said first means comprising:

a first pulse generator for producing a first pulse per one revolution of said recording medium;

a second pulse generator for producing a second pulse in synchronism with the horizontal synchronizing signal, said second pulse having a width which is sequentially and periodically varied in response to the first pulse output from said first pulse generator; and an oscillator for producing a pilot signal in synchronism with a trailing edge of said second pulse; and said second means comprising:

extracting means for extracting a horizontal synchronizing signal and a pilot signal from a reproduction signal; and detecting means for detecting a phase difference between the extracted pilot signal and the extracted horizontal synchronizing signal.

2. The tracking information detecting system of claim 1, wherein said pulse generator comprises:

a synchronizing signal separator for separating a horizontal synchronizing signal from a video signal;

a plurality of monostable multivibrators respectively having predetermined respective time constants defined correspondingly to the repetition period of said pilot signal, said monostable multivibrators being triggered at the leading edge of the horizontal synchronizing signal output from said synchronizing signal separator; and a logic gate for cyclically selecting one of said multivibrators according to the first pulse output from said first pulse generator.

3. The tracking information detecting system of claim 1, wherein said extracting means comprises:

a high pass filter for extracting the video signal from the reproduction signal;

a band pass filter for extracting the pilot signal from the reproduction signal; and a synchronizing signal separator for separating the horizontal synchronizing signal from the video signal.

4. The tracking information detecting system of claim 1, wherein said detecting means includes:

means for pulse-width-modulating the horizontal synchronizing signal according to the order of the tracks, thereby producing a sampling pulse in synchronism with the trailing edge of the pulse-width-modulated horizontal synchronizing signal;

means for producing a sawtooth signal in synchronism with the extracted pilot signal; and means for comparing the phase of said sawtooth signal with that of said sampling pulse for obtaining a tracking information.

5. The tracking information detecting system of claim 1, wherein said detecting means comprises:

a counting pulse generator for producing a counting pulse per one revolution of said recording medium;

a pulse width modulator for periodically varying the width of the extracted horizontal synchronizing signal by a predetermined amount in response to the output of said counting pulse generator;

a sampling pulse generator for producing a sampling pulse in synchronism with the trailing edge of the pulse-width-modulated horizontal synchronizing signal;

a wave form generator for producing a sawtooth signal in synchronism with the extracted pilot signal; and a comparator for comparing the phase of said sawtooth signal with that of said sampling pulse so as to obtain a tracking information.

6. The tracking information detecting system of claim 1, wherein said first means shifts the phase of the pilot signal by 90° for every track, thereby obtaining the same amount of shift for every four tracks.

7. The tracking information detecting system of claim 1, wherein said oscillator produces said pilot signal of 250 KHz.

8. A tracking information detecting system for a video signal recorder/reproducer for recording/reproducing a video signal by tracing along tracks annularly formed on a disc-shaped recording medium rotated by a motor at a predetermined angular velocity, said video signal including a horizontal synchronizing signal, said detecting system comprising:

first means for recording on said recording medium a pilot signal having a frequency at least ten times higher than that of the horizontal synchronizing signal together with a video signal by shifting the phase of the pilot signal a predetermined amount for every track; and second means for reproducing the video signal and the pilot signal previously recorded on said recording medium and for detecting the phase difference between the horizontal synchronizing signal and the pilot signal for every track so as to obtain the tracking information corresponding to said phase difference;

said first means comprising:

a first pulse generator for producing a first pulse per one revolution of said recording medium; and a pulse width modulator for periodically modulating the pulse width of a horizontal synchronizing signal of a video signal by varying the pulse width in response to the first pulse; and said second means comprising:

extracting means for extracting the horizontal synchronization signal and the pilot signal from a reproduction signal; and detecting means for detecting the phase difference by comparing a phase of the extracted pilot signal with that of the extracted horizontal synchronization signal.

9. The tracking information detecting system of claim 8, wherein said pulse width modulator comprises:

a synchronizing signal separator for separating a horizontal synchronizing signal from a video signal;

a plurality of monostable multivibrators respectively having a predetermined time constant according to the repetition period of said pilot signal, and said monostable multivibrators being triggered at the leading edge of the output pulse of said synchronizing signal separator;

a logic gate for cyclically selecting one of said multivibrators according to the outputs of said counting pulse generator;

an analog switch which becomes nonconductive during the period of the horizontal synchronizing signal of the video signal; and a mixer for mixing the output of said analog switch and the output of said logic gate.

10. The tracking information detecting system of claim 9, further comprising a frequency modulator for adding to the output of said oscillator the sum being recorded on said recording medium.

11. The tracking information detecting system of claim 8, wherein said extracting means comprises:

a high pass filter for extracting the video signal from the reproduction signal;

a band pass filter for extracting the pilot signal from the reproduction signal; and a synchronizing signal separator for separating the horizontal synchronizing signal from the video signal.

12. The tracking information detecting system of claim 8, wherein said detecting means includes:

means for pulse-width-modulating the horizontal synchronizing signal sequentially by a predetermined amount according to the order of the tracks, thereby producing a sampling pulse in synchronism with the trailing edge of the pulse-width-modulated horizontal synchronization signal;

means for producing a sawtooth signal in synchronism with the extracted pilot signal; and means for comparing the phase of said sawtooth signal with that of said sampling pulse for obtaining a tracking information.

13. The tracking information detecting system of claim 8, wherein said detecting means comprises:

a counting pulse generator for producing a counting pulse at every one revolution of said recording medium;

a pulse width modulator for periodically varying the pulse width of the extracted horizontal synchronizing signal by a predetermined amount in response to the output of said counting pulse generator;

a sampling pulse generator for producing a sampling pulse in synchronism with the trailing edge of the pulse-width-modulated synchronization signal;

a wave form generator for producing a sawtooth signal in synchronism with the extracted pilot signal; and a comparator for comparing the phase of said sawtooth signal with that of said sampling pulse so as to obtain a tracking information.

14. The tracking information detecting system of claim 8, wherein said first means shifts the phase of the pilot signal by 90° for every track, thereby obtaining the same amount of shift for every four tracks.

15. A tracking information detecting system for detecting a tracking information while a pickup means of said system traces along tracks annularly formed on a disc-shaped recording medium rotated by driving means, said tracks being formed such that a video signal together with a pilot signal are recorded on the tracks, said pilot signal having a frequency at least ten times higher than that of a horizontal synchronizing signal included in the video signal, and said pilot signal being sequentially and periodically phase-shifted according to a mentioned order of said tracks, thereby providing a predetermined amount of phase-shift to a leading edge of said horizontal synchronizing signal, the tracking information detecting system comprising:

extracting means for extracting the horizontal synchronizing pulses and the pilot signal from a reproduction signal reproduced via said pickup means; and detecting means for detecting the phase difference between the phase of the extracted horizontal synchronization pulses and that of the extracted pilot signal; and said detecting means comprising:

a pulse width modulator for periodically varying the pulse width of said extracted horizontal synchronizing pulse by a predetermined amount according to the order of the tracks and for producing pulse width varied output pulses;

a pulse generator for producing a sampling pulse in synchronism with a trailing edge of the output pulses of said pulse width modulator;

a wave form generator for producing a sawtooth signal synchronized with said extracted pilot signal; and a phase comparator for comparing the phase of said sawtooth signal with that of said sampling signal so as to obtain a tracking information signal.

16. A tracking information detecting system for detecting a tracking information while a pickup means of said system traces along tracks annularly formed on a disc-shaped recording medium rotated by a driving means, said tracks being formed such that a video signal together with a pilot signal are recorded on the tracks, said pilot signal having a frequency at least ten times higher than that of a horizontal synchronizing signal included in the video signal, said synchronizing signal being pulse-width-modulated by periodically extending the pulse width thereof in a stepwise manner according to a mentioned order of said tracks, said pilot signal being produced in synchronism with respective trailing edges of the modulated horizontal synchronizing signal, the tracking information detecting system comprising:

extracting means for extracting the horizontal synchronizing pulse and the pilot signal from a reproduction signal reproduced via said pickup means; and detecting means for detecting the phase difference between the phase of the extracted horizontal synchronizing pulses and that of the extracted pilot signal;

said detecting means comprising:

a pulse width modulator for sequentially and periodically varying the pulse width of said extracted horizontal synchronizing pulse for every track and for producing pulse width varied output pulses;

a pulse generator for producing a sampling pulse in synchronism with a trailing edge of the output pulses of said pulse width modulator;

a wave form generator for producing a sawtooth signal synchronized with said extracted pilot signal; and a phase comparator for comparing the phase of said sawtooth signal with that of said sampling signal so as to obtain a tracking information signal.

* * * * *